(12) United States Patent
Akenine-Moller et al.

(10) Patent No.: US 9,269,180 B2
(45) Date of Patent: Feb. 23, 2016

(54) COMPUTER GRAPHICS PROCESSOR AND METHOD FOR RENDERING A THREE-DIMENSIONAL IMAGE ON A DISPLAY SCREEN

(71) Applicant: Intel Corporation, Santa Clara, CA (US)

(72) Inventors: Tomas Akenine-Moller, Lund (SE); Carl Jacob Munkberg, Malmo (SE); Jon Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/326,841

(22) Filed: Jul. 9, 2014

(65) Prior Publication Data

US 2014/0320487 A1   Oct. 30, 2014

Related U.S. Application Data

(63) Continuation of application No. 12/095,636, filed as application No. PCT/SE2006/001365 on Nov. 29, 2006, now Pat. No. 8,803,872.

(60) Provisional application No. 60/742,357, filed on Dec. 5, 2005.

(51) Int. Cl.
    *G06T 15/00*   (2011.01)
(52) U.S. Cl.
    CPC .................................. *G06T 15/005* (2013.01)

(58) Field of Classification Search
    None
    See application file for complete search history.

(56) References Cited

U.S. PATENT DOCUMENTS

| | | | |
|---|---|---|---|
| 5,945,997 A | 8/1999 | Zhao | |
| 6,229,553 B1 | 5/2001 | Duluk | |
| 6,496,183 B1 * | 12/2002 | Bar-Nahum | ................ 345/419 |
| 6,552,723 B1 | 4/2003 | Duluk | |
| 6,680,741 B1 | 1/2004 | Yasui | |
| 6,714,196 B2 | 3/2004 | McCormack | |
| 6,717,576 B1 | 4/2004 | Duluk | |
| 7,061,486 B2 | 6/2006 | Sowizral | |
| 7,081,895 B2 | 7/2006 | Papakipos | |
| 7,154,507 B1 | 12/2006 | Moreton | |
| 7,525,553 B2 | 4/2009 | Barenbrug | |
| 2006/0232596 A1 * | 10/2006 | Barenburg et al. | ........... 345/581 |

FOREIGN PATENT DOCUMENTS

JP     10320573      12/1998
WO   2005/057501    6/2005

* cited by examiner

Primary Examiner — Said Broome
(74) Attorney, Agent, or Firm — Trop Pruner & Hu, P.C.

(57) ABSTRACT

A computer graphics processor and a method for rendering a three-dimensional image on a display screen. The computer graphics processor comprises a rasterizer configured to perform pixel traversal of a primitive after projection of the primitive. Furthermore, the rasterizer is configured to perform the pixel traversal of a first primitive for a plurality of views prior to performing pixel traversal of a next primitive for one or several views.

15 Claims, 6 Drawing Sheets

COMPUTER GRAPHICS PROCESSOR AND METHOD FOR RENDERING A THREE-DIMENSIONAL IMAGE ON A DISPLAY SCREEN

CROSS-REFERENCE TO RELATED APPLICATIONS

This application is a continuation of U.S. patent application Ser. No. 12/095,636, filed on Sep. 15, 2010, which is a 371 of PCT/SE06/01365, filed on Nov. 29, 2006, which claims benefit of Provisional Application Ser. No. 60/742,357, filed on Dec. 5, 2005.

TECHNICAL FIELD OF THE INVENTION

The present invention relates to the field of computer graphics. More particularly, the invention relates to a computer graphics processor and a method for rendering a three-dimensional image on a display screen.

DESCRIPTION OF RELATED ART

It is becoming more and more popular to provide three-dimensional (3D) images on display screens. A three-dimensional impression can e.g. be created by using stereo images, holographic techniques, or multiple planes in the displays, etc. Thus, a three-dimensional image may be a set of two-dimensional images created from a three-dimensional scene. That is, the set of two-dimensional images are created for generating a three-dimensional impression. The set contains at least one image.

There are different ways to produce stereo images. The images may, for example, be time-multiplexed on a two-dimensional (2D) display, but in general this requires that the viewer wear an attribute such as special glasses. If the stereo images are displayed at the same time, the images can be directed to the appropriate eye by using e.g. polarized glasses or a head-mounted display. A disadvantage with this solution may be that the two images in general produce only a limited "look around" capability. Moreover, glasses or a head-mounted display must be worn by the viewer to produce any 3D effect. This may be unpleasant for the viewer.

In an alternative solution, the stereo images may be split at the display screen by means of a splitting screen such as a parallax barrier. The view of the display screen may be autostereoscopic, which means that no special glasses or other peripheral equipment are required to view a 3D image on the display screen. However, in general this solution works only for one viewer at a fixed position. Furthermore, the "viewing zone" may be narrow. Outside the "viewing zone", the viewer may see multiple images or a stereo inversion. This may in turn lead to an unpleasant view of the displayed 3D image.

A computer graphics processor (CGP) has been proposed by Emmet Kilgariff and Randy Fernando in "The GeForce Series GPU Architecture" (GPU Gems 2) edited by Matt Pharr and published by Addison Wesley in 2005. FIG. 1 illustrates a block diagram of such a conventional CGP 10. The CGP 10 may comprise a programmable vertex shader PVS 11. The PVS 11 may be adapted to perform per-vertex computations. The per-vertex computations may be applied to each vertex sent through the CGP pipeline shown in FIG. 1. The per-vertex computations may e.g. involve various matrix transforms (in order to, for example, animate or position and orient an object), projection, lighting computations, skinning, animation, and other per-vertex computations. In general, when the PVS 11 has finished its operations, a vertex has been transformed into a screen space. Furthermore, various other per-vertex data, e.g., texture coordinates, attributes like diffuse and specular color may be sent downwards the CGP pipeline of FIG. 1 with the vertex. Vertices may then be grouped into so-called primitives, such as triangles, polygons, lines, points, curved surfaces, etc.

Furthermore, the CGP 10 may comprise a rasterizer setup unit RSU 12. The RSU 12 may e.g. be adapted to perform per-primitive operations, remove primitives that are not visible, clip primitives that intersect the visible region of the screen, or perform edge and plane equation setup on the data in preparation for rasterization, etc.

Moreover, the CGP 10 may comprise a rasterizer 13. The rasterizer 13 may be adapted to determine which pixel locations (or samples, if multisampling is enabled) are covered by each projected primitive. In general, these pixel locations are called "fragments" because they can be thought of as "candidate pixels". This is because they may end up in a color buffer or in other buffers, e.g., a depth buffer comprised in a frame buffer 19. The fragments may be forwarded to a Z-cull unit 14. By using a conservative test, the Z-cull unit 14 can determine whether a group of fragments are hidden with respect to the contents of the depth buffer (i.e., already rendered primitives). Hence, depth reads and in some cases, also texturing and fragment program execution can be avoided for hidden fragments. This may increase performance.

For fragments inside the primitives that pass the Z-cull unit 14, a fragment shader program may be executed in a fragment-processing unit FPU 15. The FPU 15 may e.g. be adapted to perform per-pixel computations and memory fetches. The processing performed by the FPU 15 may be applied to all fragments that reach the FPU 15. The FPU may e.g. be adapted to perform memory fetches from textures and merge the result from the texture with other computed values, such as, realistic lighting computed by per-pixel diffuse and specular shading, or bump mapping, etc. The goal of the FPU 15 may be to determine the color of each fragment.

Memory fetches performed by the FPU 15 may include access to image textures, and this is in general done via a texture cache memory device TCM 16. This may be done in order to reduce the demands on texture bandwidth. If the data is not available in the texture cache memory device 16, some part of the data in the cache may be removed and replaced with the desired data that can, for example, be fetched from an external memory device EXM 17. The goal of the texture cache 16 is in general to reduce the memory fetches from the external memory 17.

In the conventional CGP 10 shown in FIG. 1, fragments leave the fragment processing unit in the order they are rasterized and sent to the "Z-compare & blend"-unit ZC&B 18. The ZC&B unit 18 may be adapted to perform, for each fragment, a depth test (comparison) against the depth buffer e.g. for making sure that the object closest to the viewer is shown when all primitives have been rendered. The ZC&B unit 18 may also be adapted to perform other tests such as stencil operations, alpha blending, etc. Finally, the resulting color may be written to the frame buffer 19. The frame buffer 19 may e.g. comprise a color buffer, the depth buffer, a stencil buffer, etc. When all primitives have been sent through the entire CGP pipeline 10, an image has been rendered and is therefore ready to be displayed on, e.g., a display screen.

It is becoming more and more popular with multi-view systems. Multi-view systems can provide stereo images to several viewers at the same time, and they can be used over a relatively large viewing angle. The higher number of views, the better image quality can in general be expected. The number of views (N) that a display is capable to show may determine the image quality and the overall motion parallax that can be represented on the display screen.

However, the CGP pipeline shown in FIG. 1 is used for one view only. Consequently, when the conventional CGP 10 is to be used for the rendering of N multiple views, the same scene must be rendered N times, one for each view, and one at a time. In general all primitives of a certain view are processed by the entire CGP 10 before all primitives of the next view are processed by the entire CGP 10. This may be a disadvantage from a performance perspective. For example, when a 3D scene is rendered, many different texture images are normally used in different parts of the scene. Assume that two textures, denoted T1 and T2, are used in a scene. First, T1 is applied to a set of primitives and rendered for view 1, and then T2 is applied to another set of primitives and rendered for view 1. Since textures are in general large, and since texture cache memory devices are in general small, only pixels from T2 will reside in the texture cache memory device 16, when the scene from view 1 has finished rendering. However, when view 2 starts rendering, primitives with texture T1 will be rendered, and it will thus not be able to use the cache contents (which now comprise pixels from texture T2).

Furthermore, since texture data is generally fetched from the texture cache memory device 16 independently for each view, the conventional CGP may also be expensive in terms of memory bandwidth. Alternatively, the CGP could be duplicated such that N CGPs are used in parallel. This may, however, be expensive in terms of hardware because of duplication. In addition, this may be costly in terms of resources. Moreover, this may require synchronization between the N different CGPs.

SUMMARY OF THE INVENTION

It is an object of the present invention to provide an improved computer graphics processor.

According to a first aspect, a computer graphics processor for rendering a three-dimensional image on a display is provided. The computer graphics processor comprises a rasterizer configured to perform pixel traversal of a primitive after projection of the primitive. Furthermore, the rasterizer is configured to perform the pixel traversal of a first primitive for a plurality of views prior to performing pixel traversal of a next primitive for one or more views.

The rasterizer may be configured to perform the pixel traversal of the first primitive for all views of the plurality of views prior to performing pixel traversal of the next primitive for all views of the plurality of views.

Furthermore, the rasterizer may be configured to perform pixel traversal for a pair of the first primitive, wherein the pair is defined by a group of pixels and a particular view, and then continue with another pair for the first primitive, and so on, until the first primitive has been fully traversed, prior to performing pixel traversal of the next primitive in the same manner as for the first primitive.

Moreover, the rasterizer may be operatively connected to a selector adapted to determine an order in which the pairs are to be processed by the rasterizer during the pixel traversal of the primitives. The selector may be configured to determine said order based on an efficiency measure for each view of the plurality of views. Furthermore, the selector may be configured to determine said efficiency measure based on $$M_i = [\, du \quad dv \,]\begin{bmatrix} tui \\ tvi \end{bmatrix},$$

which corresponds to projecting the texture coordinate (tui, tvi) of a representative point of a group of pixels onto the texture traversal direction (du,dv) in texture space, and $M_i$ is the efficiency measure for a view i, and where said group of pixels is next subject to traversal for view i, and the view that is selected for traversal next is the view k, where $M_k$ has the lowest value.

The computer graphics processor may be adapted to, for at least a first view, generate fragments of the at least first view by executing a fragment shader program. The computer graphics processor may further be adapted to, for at least a second view, generate fragments of the at least second view based on the generated fragments of the at least first view.

The computer graphics processor may comprise a memory and be adapted to temporarily store the generated fragments of the first view in the memory. A position of a fragment of the second view may be projected into the first view. If fragments of the first view in a neighborhood of the projected position of the fragment of the second view are stored in the memory, the fragment of the second view may be generated based on said fragments in said neighborhood. Otherwise, the fragment of the second view may be generated by executing the fragment shader program.

The computer graphics processor may be adapted to generate texture coordinates for the fragment of the second view and use these texture coordinates to project the position of the fragment of the second view into the first view.

The computer graphics processor may be adapted to generate the fragment of the second view based on said fragments in said neighborhood as a weighted average of said fragments in said neighborhood.

If at least two fragments of the first view in said neighborhood is stored in the memory, the fragment of the second view may be generated by performing linear interpolation on the two of said at least two fragments that are closest to said projected position. If exactly one fragment of the first view in said neighborhood is stored in the memory, the fragment of the second view may be generated identical to said exactly one fragment.

Two positions, whose arithmetic average is the position of the fragment of the second view, may be projected into the first view. If fragments of the first view in neighborhoods of the projected positions are stored in the memory, the fragment of the second view may be generated based on said fragments in said neighborhoods. Otherwise, the fragment of the second view may be generated by executing the fragment shader program.

The computer graphics processor may be adapted to weight fragments some or all views into a common color buffer.

According to a second aspect, a method of rendering a three-dimensional image on a display comprising performing pixel traversal of a primitive after projection of the primitive is provided. The method comprises the step of performing the pixel traversal of a first primitive for a plurality of views prior to performing pixel traversal of a next primitive for one or more views.

The step of performing the pixel traversal of the first primitive for the plurality of views prior to performing pixel traversal of the next primitive for one or more views may comprise performing the pixel traversal of the first primitive for all views of the plurality of views prior to performing pixel traversal of a next primitive for all views of the plurality of views.

Furthermore, the step of performing may comprise performing pixel traversal for a pair of the first primitive, the pair being defined by a group of pixels and a particular view, and continuing with another pair for the first primitive, and so on, until the first primitive has been fully traversed, prior to performing pixel traversal of the next primitive in the same manner as the first primitive.

The method may also comprise determining an order in which the pairs are to be processed during the pixel traversal of the primitives. The step of determining may further comprise the steps of determining said order based on an efficiency measure for each view of the plurality of views, and determining said efficiency measure based on $$M_i = \begin{bmatrix} du & dv \end{bmatrix} \begin{bmatrix} tui \\ tvi \end{bmatrix},$$

where Mi is the efficiency measure for a 3D view i, and where (du, dv) denotes texture traversal direction in a texture space, (fu, fv) denotes coordinates of a pixel on the texture traversal direction in the texture space, and (tui, tvi) denotes coordinates in the texture space for the next pixel of view i to be subject to the traversal.

The method may comprise generating fragments of a first view by executing a fragment shader program and generating fragments of a second view based on the generated fragments of the first view.

According to a third aspect, a computer program product is provided. The computer program product comprises computer program code means for executing the method according to the second aspect, when said computer program code means are run by an electronic device having computer capabilities.

According to a fourth aspect, a computer readable medium is provided. The computer readable medium has stored thereon a computer program product comprising computer program code means for executing the method according to the second aspect, when said computer program code means are run by an electronic device having computer capabilities.

Further embodiments of the invention are defined in the dependent claims.

Embodiments of the invention may allow for a reduction of the required utilization of memory-bandwidth of a computer graphics processor. Furthermore, some embodiments of the invention may reduce the number of fragment shader program executions of a computer graphics processor.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of the invention will appear from the following detailed description of embodiments, reference being made to the accompanying drawings, in which:

FIG. 3b is a screen diagram showing pixels in a texture space along a texture traversal direction for the primitive of FIG. 3a;

DETAILED DESCRIPTION OF EMBODIMENTS

Figure 2:
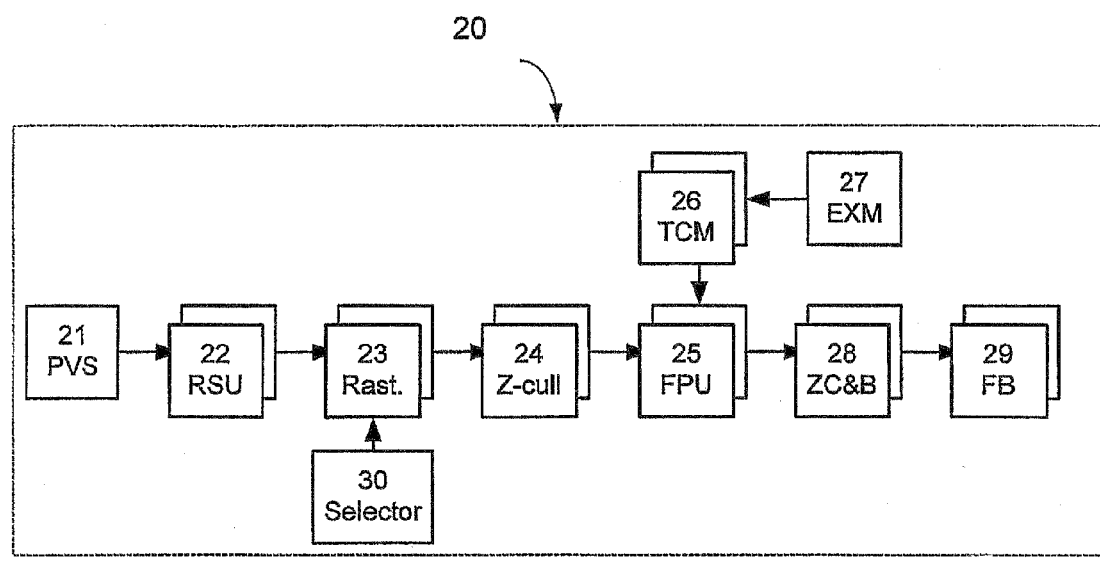
FIG. 2 is a block diagram of a computer graphics processor according to embodiments of the present invention.

FIG. 2 illustrates a computer graphics processor (CGP) 20 according to embodiments of the invention. The CGP 20 may be used for rendering of three-dimensional images on one or more display screens. The CGP 20 comprises a rasterizer 23 configured to perform pixel traversal of a primitive after projection of the primitive. Said primitive may be a triangle, a polygon, a line, a point, a curved surface, etc. In a multi-view system with N views, the projected primitive may occupy a part of the screen space for each of the multiple N views. Furthermore, pixel traversal is the process performed by the rasterizer 23, whereby it is determined which pixel locations (or samples, if multisampling is enabled) are inside the primitive being rendered.

The rasterizer 23 may be configured to perform the pixel traversal of a first primitive for a plurality of views prior to performing pixel traversal of a next primitive for one or more views. Furthermore, the rasterizer 23 may be configured to perform the pixel traversal of the first primitive for all views of the N views prior to performing pixel traversal of the next primitive for all views of the N views. Yet further, the rasterizer 23 may be configured to perform pixel traversal for a "pair", and then continuing with another pair, and so on, until the first primitive has been rendered for all or a plurality of views, prior to performing pixel traversal (in the same manner as for the first primitive) of a next primitive. As used herein, the term "pair" should be appreciated to be defined as a group of pixels and a particular view.

In order to exemplify the above, assume that a primitive P is projected to the different views in the display screen. The views may be enumerated from 1 to N, where N is the total number of views. The primitives projected to each view are called Pi, where i is the view number. The projected primitive P is thus denoted P1 for the first view, P2 for the second view and PN for the Nth view, etc. According to some embodiments of the invention, a pixel traversal method may be implemented, wherein P1 is rendered first, then P2, P3, and so on until PN has been rendered. When a first primitive P has been rendered for all N views, a second primitive P' for all N views may be processed similarly and so on for further primitives. This may allow for advantages in terms of exploiting the coherency in rendering for N nearby views. There is a lot of coherency herein, since the images that are generated for, e.g., two views that are close to each other are quite similar. Therefore, when rendering a primitive that applies a fragment program to each visited fragment, it is very likely that pixels from textures used when rendering P1 will reside in the texture cache memory device 26 when rendering P2, P3, and so on. This is a consequence of the fact that the images from the N different views are in general similar. This may allow for an efficient utilization of the texture memory bandwidth. Accordingly, a performance advantage can be expected. This is so, since texturing is in general one of the major memory bandwidth consumers in a computer graphics processor.

Embodiments of the invention, wherein primitives are rendered for two different views will be described in the following. However, this should not be interpreted restrictively, but rather as an example. Thus, the reasoning below applies also for a multi-view system with N views, where N>2. In this example, the two different views are denoted V1 and V2. As is illustrated in FIG. 2, the CGP 20 may comprise a programmable vertex shader PVS 21 adapted to perform per-vertex computations for the two views V1 and V2. Some computations that depend on view parameters may need to be duplicated. However, there are many computations that may be the same for both views, and these need only be computed once. Such computations may include, for example, per vertex displacement mapping or diffuse shading. The PVS 21 may be operatively connected to a rasterizer setup unit RSU 22.

The RSU 22 may e.g. be adapted to perform per-primitive operations, remove primitives that are not visible, clip primitives that intersect the visible region of the screen, or perform edge and plane equation setup on the data in preparation for rasterization, etc. The RSU 22 may need to duplicate some of the computations. For the two views V1 and V2, this can e.g. be done in parallel for good performance or serially to save hardware. However, there are also computations that may be shared between the two views. Such computations may include, for example, the depth at the vertices depending on projection. The RSU 22 may be adapted to perform setup computations for a certain primitive for both views V1 and V2.

The RSU 22 may be operatively connected to a rasterizer 23. The rasterizer 23 may be adapted to locate pixels within the certain primitive, which has been projected for both views V1 and V2, e.g. to the screen space. In some embodiments, the rasterizer 23 may be operatively connected to a selector 30. Although the rasterizer 23 and the selector 30 are shown as separate units in FIG. 2, it should be appreciated that the selector 30 may alternatively be incorporated into the rasterizer 23. The selector 30 may be adapted to determine in which order the rasterizer 23 should process a primitive for the views V1 and V2. Assume, for example, that V1 is selected by the selector 30 to be processed first. Once V1 has been selected by the selector 30, the rasterizer 23 may attempt to find a pixel or a group of pixels inside the certain primitive for view V1. Thus, the rasterizer 23 may be adapted to locate a pixel or a group of pixels inside the primitive for the selected view. In some embodiments, the selector 30 may be adapted to determine the above-mentioned order based on an efficiency measure for each view of the two views V1 and V2. This will be described in further detail hereinbelow. In general, one can say that the selector is adapted to select a pair, comprising a group of pixels and a particular view, to be processed next by the rasterizer 23. Thus, it is possible to select a group of pixels for a view (e.g. view V2), and then continue to select a group of pixels for another view (e.g. view V1), etc.

In some embodiments, the selector 30 may also be adapted to update the efficiency measure. Hence, when it is possible to begin processing a new pixel or group of pixels, the selector 30 may update the efficiency measure. Then, the selector 30 may select, in dependence of the updated measure, which view of the two views to continue processing. This information may be sent to the rasterizer 23. When a view has been selected, the rasterizer 23 may find a pixel or a group of pixels in the primitive for that view. Thus, first some part of the primitive from the first view V1 may be processed by the rasterizer 23, and then some part of the primitive from the another view (possibly the same) may be processed by the rasterizer 23, and so on. Thus, the selector may be adapted to determine in which order the rasterizer 23 should process different groups of pixels for the views V1 and V2. The selection performed by the selector will be described in further detail hereinbelow.

The selector 30 may also be adapted to select a pair, the pair being defined as a particular view and a group of pixels therein, and then select another pair. To exemplify this, assume that a primitive in the form of a triangle is drawn for two views V1, V2. Furthermore, assume that the triangle comprises two groups of pixels, P1 and Q1, for view V1. For view V2, assume that the triangle comprises two groups of pixels, P2 and Q2. For example, Q1 and Q2 may comprise exactly the same pixels. The selector may be adapted to perform an arbitrary order for P1, P2, Q1, and Q2. Since P1 relates to view V1, one can look at P1 as a pair (consisting of the group of pixels and the view). Similarly, since Q1 relates to view V1, one can look at Q1 as a pair (consisting of the group of pixels and the view). The same applies for pixel groups P2 and Q2 in view V2.

Furthermore, it should be appreciated that the selector 30 may be adapted to select a view first and then a group of pixels. Alternatively, the selector 30 may be adapted to select a group of pixels first an then a view.

The located pixel or group of pixels may be forwarded through the CGP 20 substantially similarly as for a single view in a conventional computer graphics processor. Z-cull may be performed in the Z-cull unit 24. This may be followed by fragment processing in a fragment-processing unit 25. The fragment-processing unit 25 may be adapted to access textures via a texture cache memory device 26. The texture cache memory device 26 may be adapted to fetch information from an external memory device 27. Hidden surface removal and blending may then be performed for the particular located pixel or group of pixels in an ZC&E-unit 28. Duplicated frame buffers 29 may be utilized to hold the information for both V1 and V2.

The selection performed by the selector 30 may be accomplished in different ways. In an embodiment, the selector 30 is adapted to determine an efficiency measure M based on how efficient it is to continue the processing with a certain view i. Each view i of the N views has its own efficiency measure $M_i$, where i is an integer in the set $\{1, 2, \ldots, N-1, N\}$. For example, the efficiency measure $M_i$ may be lower the better it is to continue processing view i. Thus, when it is time to continue processing a new pixel or a new group of pixels, processing may continue for view k, where $M_k$ is the lowest of the efficiency measures $M_1, M_2, \ldots, M_N$.

When a pixel or group of pixels have been processed for a view k, the efficiency measure $M_k$ may be updated. The efficiency measure according to this embodiment may e.g. be based on texture cache contents, access patterns of different buffers, execution of fragment shaders, or any combination thereof.

In an embodiment, the selector 30 is adapted to determine an efficiency measure M according to the following description. Only horizontal parallax is considered herein, i.e. only the x-coordinate differs between the views. This should, however, not be interpreted restrictively, but rather as an example. In this embodiment the content of the texture cache memory device 26 is exploited for all N views at the same time. During the pixel traversal, rational basis functions that represent normalized perspectively-correct interpolation parameters (tu, tv) may be computed for each pixel. According to McCool et al. ("Incremental and Hierarchical Hilbert Order Edge Equation Polygon Rasterization" by Michael McCool, Chris Wales, and Kevin Moule, in Graphics Hardware 2001) the (tu,tv)-coordinates can be computed for each pixel using the edge equations for a triangle. For other primitives, other methods may be employed. For a triangle there are three edge functions, denoted E0(x,y), E1(x,y), E2(x,y), where (x,y) is the pixel coordinates. For a particular pixel, the coordinates (tu,tv) are then computed as:

$$tu = E1(x,y)/(E0(x,y)+E1(x,y)+E2(x,y))$$

$$tv = E2(x,y)/(E0(x,y)+E1(x,y)+E2(x,y))$$

Assume that each vertex has a scalar, si, where i=0, 1, 2, and that we want to interpolate this scalar value over the triangle with perspective taken into account. This is then done as:

$$s(x,y) = (1-tu-tv)s0 + tu*s1 + tv*s2.$$

It should be pointed out that other definitions and/or computations of texture coordinates apply to our algorithm as well.

For simple notation, the normalized perspectively-correct interpolation parameters (tu,tv) may be referred to as "texture coordinates", and these texture coordinates may e.g. be in the range 0.0 to 1.0. The coordinate system where (tu,tv) resides is referred to as "texture space". The texture coordinates may be used to interpolate any arbitrary attributes in perspective over the primitive. For each view of the N views and for each point inside the primitive, there exists such coordinates. For view V1, the coordinates are referred to as (tu1, tv1) and for view V2, they are denoted (tu2, tv2), etc.

Figure 3A:
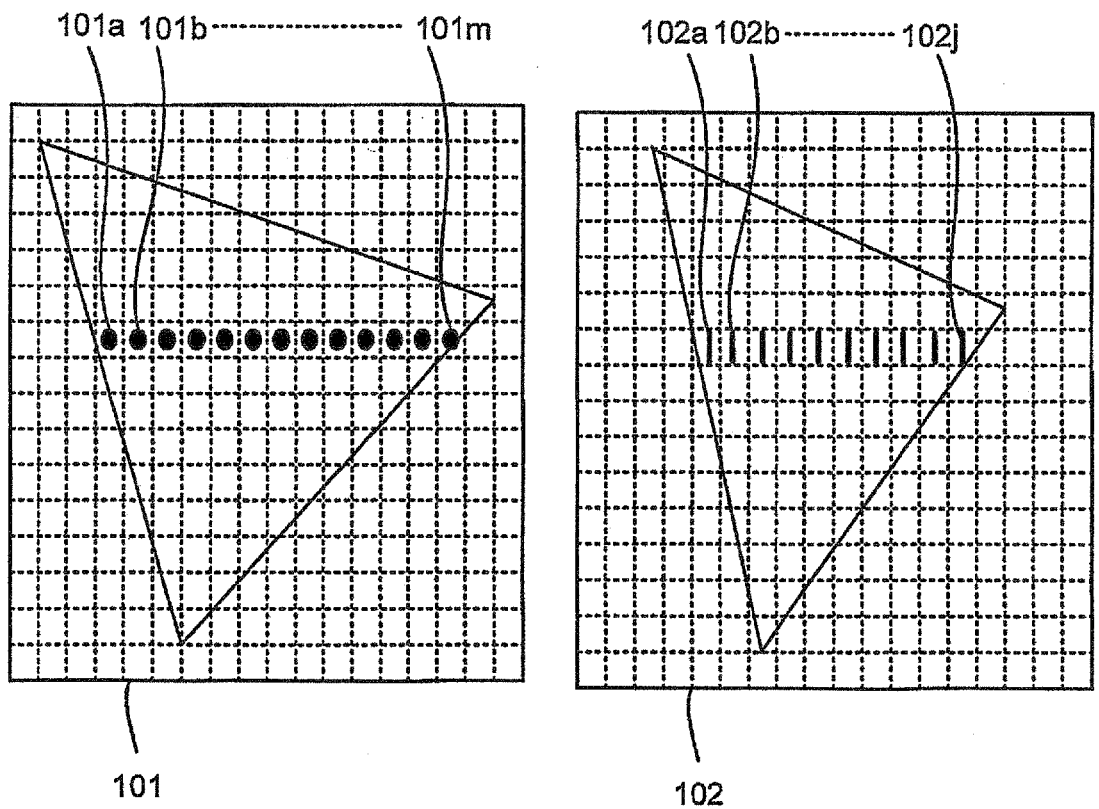
FIG. 3a is a pixel diagram showing a primitive projected to a screen from two different views.
Figure 3B:
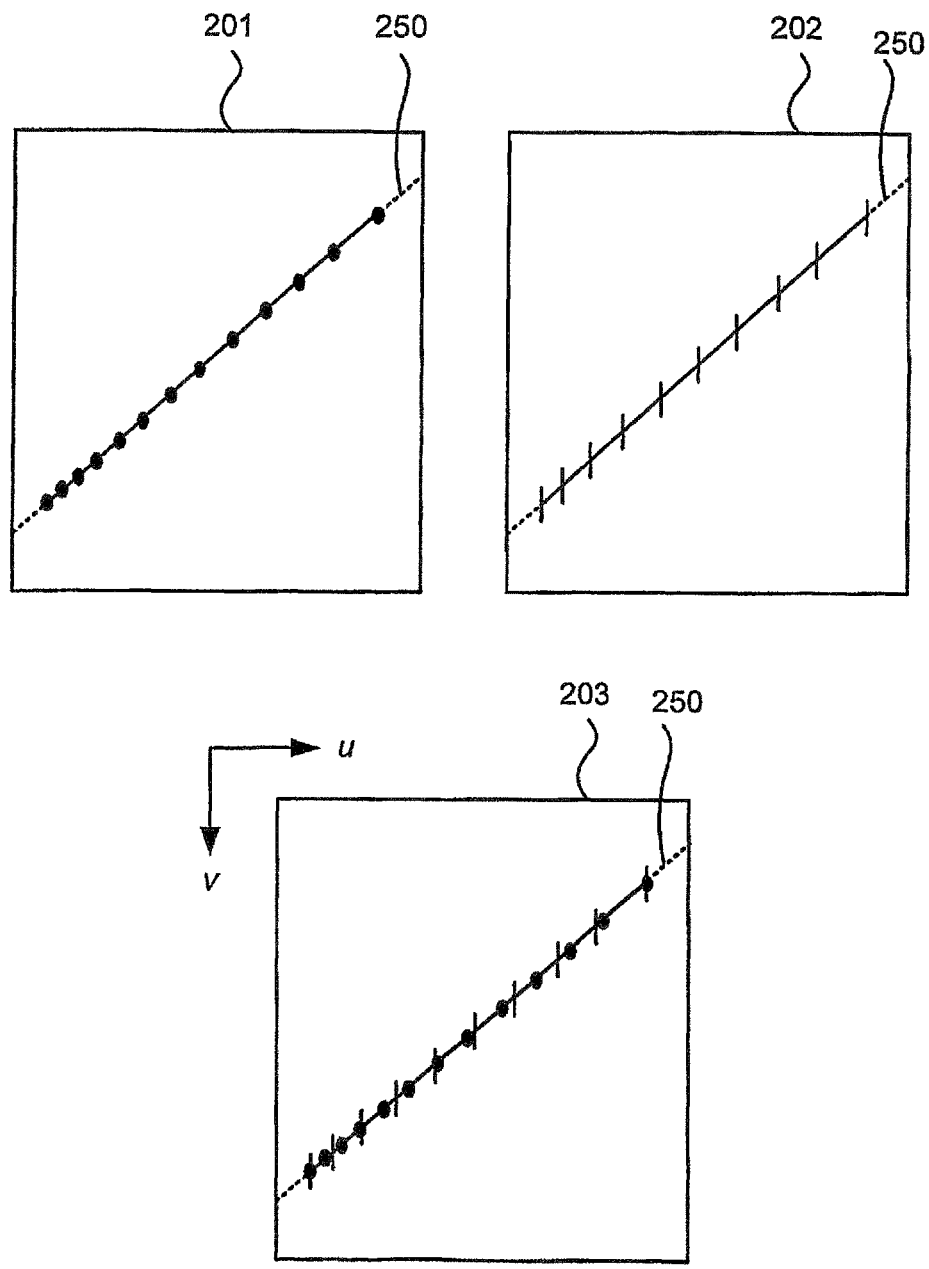

In FIG. 3, the background to an efficiency measure taking into account the texture cache memory device 26 is illustrated. A projected primitive is shown in screen space for both view V1 101 and for view V2 102. Only a stereo system is shown for simplicity, but it should be appreciated that the reasoning applies to any number of views N. A single horizontal scanline at a time is considered. The pixels in the projected primitive that appear on the horizontal scanline are indicated in FIG. 3a. For view V1, these pixels are 101a, 101b, ... 101m, and for view V2, these pixels are 102a, 102b, ... 102j. In FIG. 3b, the corresponding pixels along the traversal direction in a texture space are shown for view V1 in 201, view V2 in 202, and a combination of views V1 and V2 in 203. The pixels of view V1 are indicated with filled ovals and the pixels of V2 are indicated with vertical lines in FIGS. 3a and b. Coordinate axes u and v are indicated in the combined view 203. As can be seen, the evenly spaced sample points in screen space are unevenly distributed in texture space due to perspective. However, they are distributed on a straight line 250, which will be referred to as the "texture traversal direction". Furthermore, the two views V1 and V2 may share this texture traversal direction due to the type of projection that is used. In this example, this is a consequence of that only horizontal parallax is considered. This is always the case for a system with only two views, but for systems with more views, it is in general required that all viewpoints of the views lie on a line. A horizontal scanline together with the viewpoint is equivalent to a 3D plane in the world space, and these planes are in general identical for all the views, and the intersection between that plane and the primitive will therefore be the same for all views. For a planar primitive (e.g., a triangle), the intersection between the plane and the triangle will be a line (same for all views), and this line projects into a line (the texture traversal direction) in texture space. For other primitives, the intersection will also be the same for all views, but the curve of intersection may not be a line.

With respect to the texture cache memory device 26, an appropriate order in which to traverse the pixels can be found by examining the screen space samples from both views V1 and V2 in texture space, e.g. in the combined view 203. For example, good texture cache performance may be obtained by performing the pixel traversal along the texture traversal direction in the order in which the samples occur along the texture traversal direction. The reason for this is, inter alia, as follows. When a texture map is accessed, one usually wants filtered color values, using for example, trilinear mipmapping (see Lance Williams, "Pyramidal Parametrics", Computer Graphics (Proceedings of ACM SIGGRAPH 83), 1983). This means that to produce a filtered color from the texture map, the neighborhood around the texture coordinates are accessed, and the colors of these accessed pixels are weighted together to form the filtered color. When a filtered color has been computed, the cache contains all the pixels from the texture that was accessed to produce the filtered color. Now, if the algorithm selects the closest point along the texture traversal direction, there is generally a good chance that it is possible to reuse the contents of the cache, compared to a case where a point that lies farther away along the texture traversal direction is chosen. It has been shown in simulations that this is true. Let [du dv] denote a vector along the texture traversal direction. An efficiency measure, $M_i$, for each view i can be defined by the following expression:

$$M_i = [du \quad dv] \begin{bmatrix} tui - fu \\ tvi - fv \end{bmatrix}, \quad (1)$$

where (fu,fv) is a texture coordinate on the texture traversal direction, e.g., the texture coordinate of the first pixel on the scanline. Thus, $M_i$ is simply the projection of the texture coordinate of the next pixel to be processed onto the texture traversal direction. The next view to traverse is simply the view, i, with the lowest efficiency measure, $M_i$. In this way, a traversal order may be obtained that corresponds to the order of the screen space samples from all N views in texture space. When a pixel has been visited for a view, i, the texture coordinate, (tui,tvi), for the next pixel is determined, and the efficiency measure, $M_i$, can be updated. The next view to traverse to is selected as before, until all pixels (or samples) on the texture traversal direction for all views have been visited. Then, a subsequent horizontal scanline and its corresponding texture traversal direction is processed and so on, until pixel traversal for the entire primitive has been performed e.g. for all views.

It should be appreciated that $M_i$ is a scalar value that may be used for selecting an order of the pixels (or samples) to be processed, and thus $M_i$ can be computed in many different ways. For example, the efficiency measure $M_i$ for each view i can also be defined by the following expression $$M_i = [du \quad dv] \begin{bmatrix} tui \\ tvi \end{bmatrix} \quad (2)$$

This expression differs from the above expression (1) in that (fu, fv) are not included. However, the expression (2) yields the same sorted order, since (fu,fv) may be constant for the entire scanline, and hence removing (fu,fv) only subtracts a constant from $M_i$, and thus, the sorted order may be equal. Moreover, it is also possible to find the largest component (in absolute value) for the texture traversal direction, and determine the sorted order based on which of the tui or tvi that corresponds to said largest component. This may give the same sorted order as well.

Hereinbelow, an example of pseudo code intended to cause a system having a processing capability to perform a method of performing pixel traversal according to embodiments of the invention is illustrated. It is to be noted that only a single scanline is considered here, since each scanline is processed similarly. Furthermore, it is to be appreciated that the pseudo code below only illustrates an example. It should be apparent that many different implementations are possible.

```
TraverseScanline(scanlinecoord y)
* determine coordinate, xi, for the leftmost pixel inside
primitive for each view on scanline y
* determine li=num of pixels on current scanline for all
views i
* determine (tui,tvi) for all views i for leftmost pixel
(xi,y)
* determine (du,dv)
* determine M_i=Equation 1 for all views i
* while (pixels left on scanline for at least one view)
*       find view, j, where M_j is the smallest and lj>0
*       visit pixel (xj,y) using (tuj, tvj) for view j
*       xj = xj + 1, lj = lj - 1
*       update (tuj,tvj) and M_j
* end
```

Figure 4:
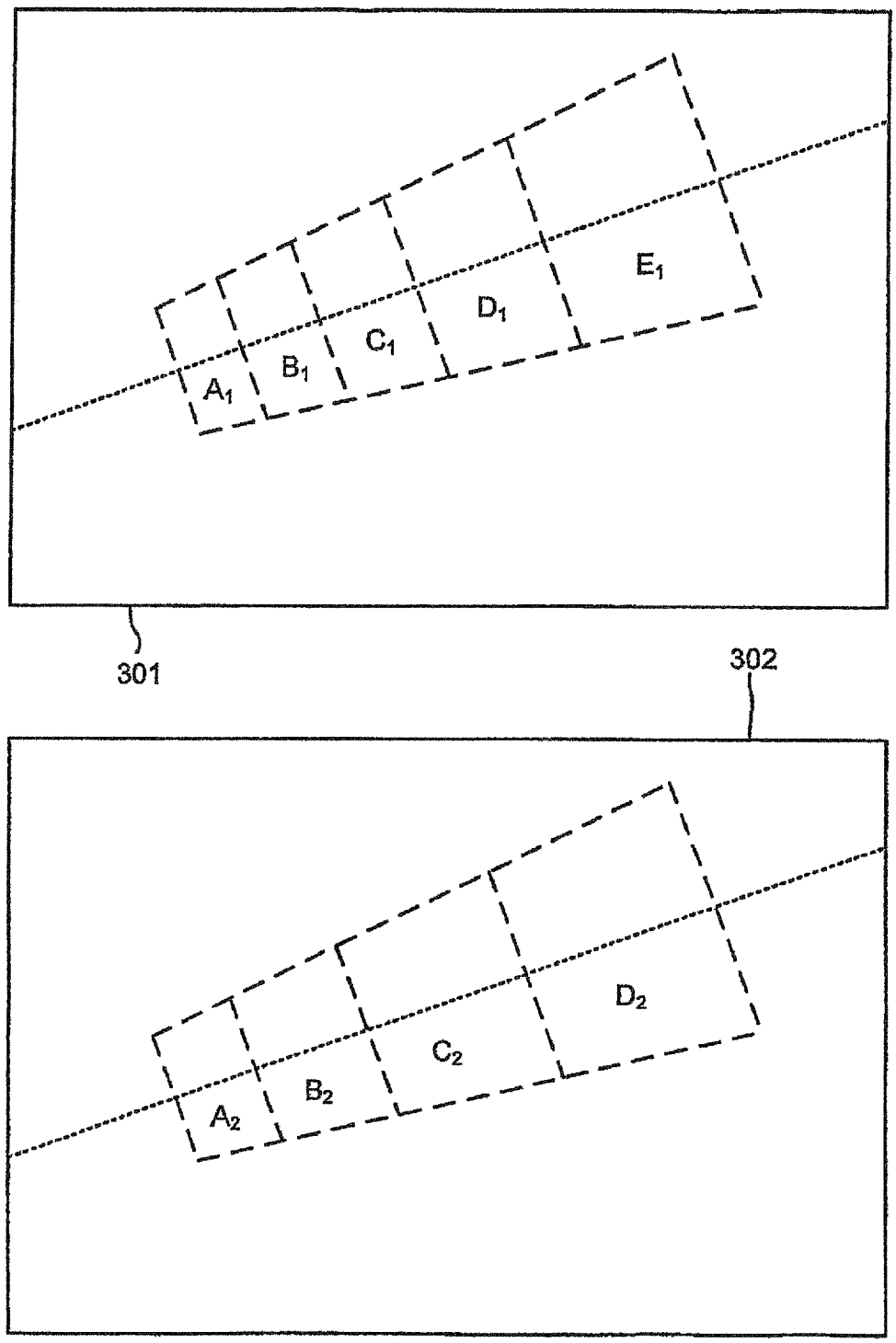
FIG. 4 is a screen diagram showing tiles of pixels in the texture space along a texture traversal direction for a primitive.

An embodiment of a tiled-based pixel traversal method is presented below. As used herein, a tile may be a rectangular set of pixels or any other shape of a set of pixels. The scanline-based traversal method described above may be extended to work on a per tile basis as well. This is done by considering the pixels in FIGS. 3a and 3b to be tiles rather than pixels. A rectangular tile in screen space projects, in general, to a convex quadrilateral in texture space. Assume that a primitive has been rasterized. In FIG. 4, a particular row of tiles covering that primitive are shown projected into texture space for view V1 301 and view V2 302. The projected tiles for view V1 are labeled $A_1$, $B_1$, $C_1$, $D_1$, and $E_1$. The projected tiles for view V2 are labeled $A_2$, $B_2$, $C_2$, and $D_2$. The projected tiles overlap the same area in texture space for the two views. Hence, a high texture cache performance may be obtained. This is especially true if the tiles are traversed in the order in which they appear along the texture traversal direction. In practice, this amounts to differences compared with previously described embodiments where only one pixel is considered at a time. First, the texture coordinate, (tui, tvi), in each tile is computed, such as the coordinate in the center of each tile. Using the coordinate in the center of each tile is only an example, other coordinates in the tile may be used as well. The texture traversal direction vector, [du dv], is a vector obtained as the difference between the texture coordinates in the center of two adjacent tiles on a row of tiles. It should be appreciated that [du dv] may be determined in a variety of ways, and that determining the texture coordinate at the center of the tile is also one of many possible choices. Furthermore, the traversal method is designed such that all tiles overlapping a primitive on a row of tiles are visited before moving on to the next row of tiles. Other choices are possible in this regard as well. For example, the tiles may be traversed in a zigzag order. That is, instead of always traversing in a left to right order, and moving downwards to the next row of tiles, when the current row of tiles has been finished, it is possible to visit the tiles in zigzag order. In zigzag order, when the end of a row of tiles is reached, one moves to the next row of tiles, and continues in the opposite (horizontal order). This gives a zigzag-like traversal order. More details about zigzag-like traversal order can be found in "Graphics for the Masses: A Hardware Rasterization Architecture for Mobile Phones", ACM Transactions on Graphics, July 2003, by Tomas Akenine-Möller and Jacob Ström.

Shared color buffer functionality may also be provided. The shared color buffer may be used to accumulate fragment output values from some or all views, and can be used to simulate, for example, depth-of field, motion-blur and anti-aliasing.

Figure 1:
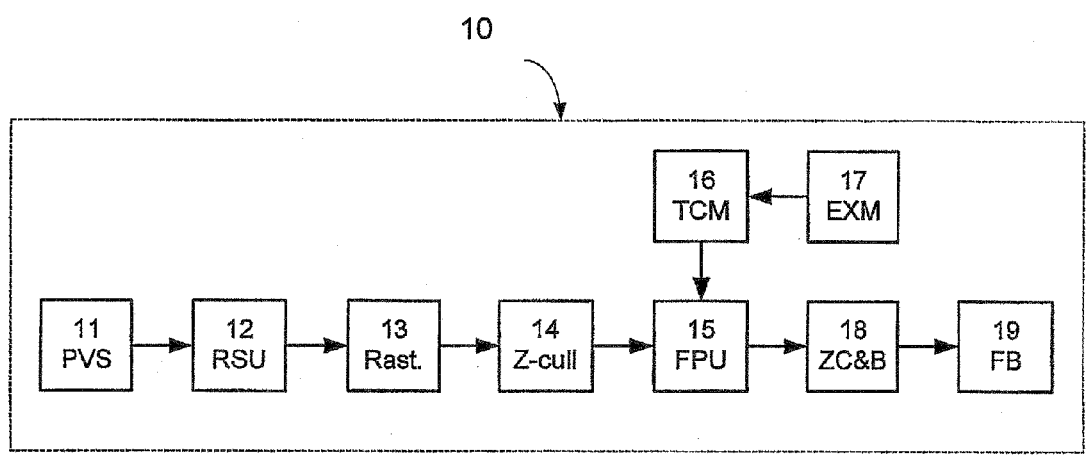
FIG. 1 is a block diagram of a conventional computer graphics processor.

For the embodiments described above, it is to be appreciated that images generated for the N different views correspond to the images that would be generated by a conventional computer graphics processor of FIG. 1 when duplicated N times, or used N times (once for each view). Thus, compared to a computer graphics processer 10 as shown in FIG. 1, the performance improvement of embodiments of the invention do not involve any degradation of the image quality.

According to other embodiments, which will be described below, a further performance improvement may be obtained by approximating fragments of some views based on fragments generated for other views. Thereby, the number of fragment shader program executions may be reduced. The additional performance improvement comes to the cost of a slightly degraded image quality.

Figure 5:
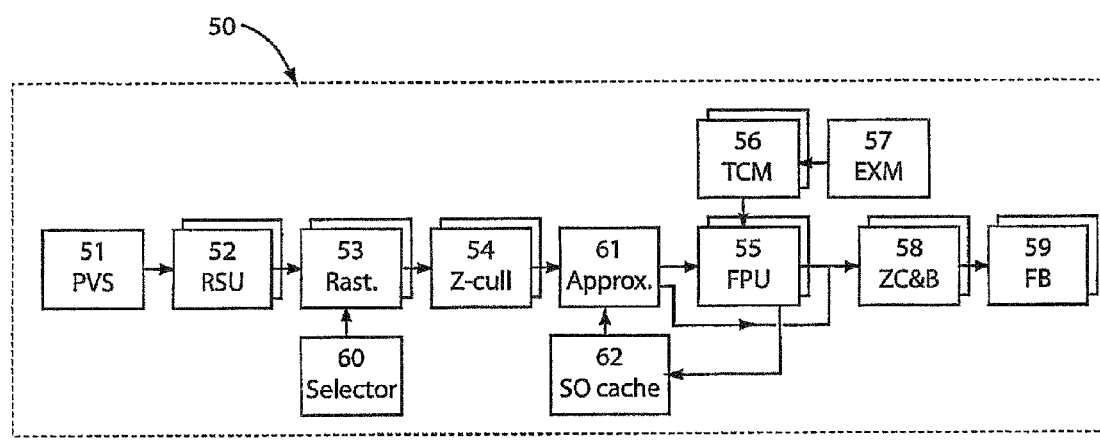
FIG. 5 is a block diagram of a computer graphics processor according to embodiments of the present invention.

FIG. 5 shows a block diagram of a CGP 50 according to an embodiment. The computer graphics processor 50 may comprises a PVS 51, an RSU 52, a rasterizer 53, a Z-cull unit 54, an FPU 55, a texture cache memory device 56, an external memory device 57, a ZC&B-unit 58, a frame buffer 59, and a selector 60. These units may be configured to operate similarly to the corresponding elements shown in FIG. 2. In addition, the CGP 50 of FIG. 5 comprises an approximation unit 61 and a shader output cache 62. Together, the approximation unit 61 and the shader output cache 62 facilitates substantial reuse of the output from the FPU 55.

The approximation unit 61 may be configured to classify views. Two types of views are used: "exact" and "approximated". Each approximated view is associated with an exact view.

The approximation unit 61 may be configured to operate in two different modes depending on whether the current view is classified as "exact" or "approximated".

For an exact view, the FPU 55 is used to execute the fragment shader program, and the output of the fragment shader program, e.g. color, depth, stencil, etc., may be written to the shader output cache 62 memory before being passed further down the graphics pipeline.

For an approximated view, information gathered while processing a primitive in the exact view associated with the approximated view may be used to approximate the output that would have been obtained from the fragment shader program if the fragment shader program would have processed the approximated view. A fragment coordinate of a primitive in the approximated view is mapped (projected) onto the viewing plane of the associated exact view. If results of the exact view from the fragment shader program in the neighborhood of the fragment coordinates is still in the shader output cache 62, the fragment shader program output for the approximated view is approximated by filtering the fragment shader program output for the exact view of the entries of neighbors found in the cache. If no result can be found in the shader cache, the fragment shader program is executed also for the approximated view.

To relate the exact and approximate views, a mapping algorithm is provided, using texture coordinates. The texture coordinates may e.g. be perspective-correct barycentric coordinates. The algorithm maps a position of a primitive in an approximated view to a position in the associated exact view.

The shader output cache 62 is provided where recent fragment information from one or more exact views is stored and can be accessed for associated approximated views.

According to some embodiments, a method of rendering a three-dimensional image on a display comprising performing pixel traversal of a primitive after projection of the primitive is provided. The method comprises the step of approximating and reusing fragment shader program output from adjacent views.

In the embodiment of FIG. 5, the approximation unit 61 is configured to process fragments differently depending on if the pair, to which that fragment belongs, is associated with an "exact view" or an "approximated view". The exact views may consist of one or more selected views from the plurality of views, and are exact in the sense that rendering is done to them by executing the fragment shader program using the FPU 55. Hence, no approximation is done for exact views.

The approximated views are selected as the remaining views of the plurality of views. Each approximated view is associated with an exact view. For each approximated view, the associated exact view is typically the exact view that is "closest", in terms of view parameters, to the approximated view.

According to one embodiment of the invention, the exact view renders a primitive by executing the fragment shader program, and the output from this execution is called "shader output". If possible, approximated views may reuse the shader output from the exact views, and weight together one or several shader outputs in order to generate approximate fragment outputs for approximated views.

If the currently processed fragment belongs to an exact view, the fragment shader program is executed using the FPU 55. The outputs of the fragment shader program, e.g., color, depth, stencil, etc., may be written to the shader output cache memory 62 before being passed further down the graphics pipeline. The shader output cache 62 may be dedicated on-chip memory, a set of flip-flops, or stored in off-chip memory, or using any other storage method.

If the currently processed fragment belongs to an approximated view, the information gathered while processing the associated exact view may be used to approximate the fragment shader program output of the approximated view. The fragment coordinates are projected onto the viewing plane of the corresponding exact view. This can be done by interpolating the positions of the vertices of the triangle in the corresponding exact view (denoted p, q, and r), using the perspective-correct interpolation parameters for the fragment in the approximated view (denoted tu and tv). The interpolation may be done on the form:

$$c=(1-tu-tv) \cdot p + tu \cdot q + tv \cdot r.$$

It is to be appreciated that these computations can be done in many other different ways, and that the approximation disclosed herein works with them as well.

The interpolated position, c, may then be projected to compute a screen space position for the current fragment in the context of the exact view. This projected position may be used to query the shader output cache memory 62 for the shader output of fragments in the neighborhood of the projected position. The shader output of a fragment in the approximated view may be computed using a filter kernel based the relationship of a fragment in the approximated view, and the exact view. Furthermore, it may be computed using linear interpolation between the two closest neighbors in the shader output cache 62, or simply set to the nearest neighbor if no two fragments can be found in the extents of the neighborhood. This may for instance occur when a fragment lie close to the edge of a triangle.

According to an embodiment, two positions, whose arithmetic average is the position of a fragment of the approximated view, are projected into the exact view. If fragments of the exact view in neighborhoods of the projected positions are stored in the shader output cache 62, the fragment of the approximated view is generated based on said fragments in said neighborhoods. Otherwise, the fragment of the approximated view is generated by executing the fragment shader program.

The shader output cache 62 may be cleared between the renderings of primitives, to avoid accidental use of data from other primitives while approximating the fragment shader program output for a fragment. The shader output cache 62 may use a cyclic replacement strategy, when the traversal order of the rasterizer 53 is incremental, i.e., one traverses as much as possible to neighboring tiles. In this case, the cyclic replacement strategy will efficiently work as a least recently used (LRU) replacement strategy. Other replacement strategies may be combined with our invention as well.

The shader output 62 cache may be structured as individual fragments, or as group of fragments. The shader output cache 62 may be an individual cache memory, or extend already existing cache memory such as a color buffer cache. Extending the color buffer cache has the drawback of not being able to use approximation when blending is enabled.

The efficiency measure ($M_i$) of a fragment, or a pair, may be penalized for approximated views by effectively computing the efficiency measure of a fragment, or a pair, further down in the traversal order. This will effectively delay the approximated views, allowing the exact views to fill the shader output cache memory 62 with relevant data. The advantage of this is that the chance that an approximated view can approximate the fragment outputs is increased.

It should also be appreciated that the exact view(s) may change from one rendering primitive to the next. This may be advantageous. For example, better performance has been achieved in simulations when the exact view is chosen as the view where the projection area of the primitive is the largest.

The approximation disclosed herein may also be used for accumulative color rendering. For this, the exact view(s) and the approximated view(s) have separate depth buffers as usual, but they all share a single color buffer. When rendering, the output color is blended into the color buffer. This can be used to render a single-view image with depth of field, for example. Other possible usages are motion blur and anti-aliasing.

The invention may be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

Finally, as is illustrated in FIGS. 2 and 5, the RSU 22, 52, the rasterizer 23, 53, the Z-cull 24, 54, the FPU 25, 55, the TCM 26, 56, and the ZC&B 28, 58 may be duplicated. Although this is not necessary for carrying out the invention, this may in some cases improve the performance of the CGP 20, 50 even further. Note, however, that it is not necessary to duplicate the PVS 21, 51 or the EXM 27, 57. Nevertheless, in some embodiments the PVS 21, 51 may require minor modification to handle a plurality of views.

It is an advantage with embodiments of the invention that they may allow for a reduction of the required utilization of memory-bandwidth of a computer graphics processor. For embodiments utilizing the above described approximated and exact views, a further advantage is that the number of times the FPU 55 executes the fragment shader program is decreased substantially. This may be advantageous since the execution of the fragment shader program may limit the obtained performance.

It has been shown in simulations for a particular 3D scene, rendered from four different views, that a conventional computer graphics processor generally utilizes up to 220% more bandwidth to the texture cache memory device compared to embodiments of the present invention. Consequently, embodiments of the invention may allow for an improvement of the performance of computer graphics processors.

In simulations of a CGP utilizing approximated and exact views, it has been shown that the obtained image quality is high and that the number of approximated fragments is high as well. The image quality can be measured using PSNR (peak signal to noise ratio), and it has been around 43 dB (decibel), which is considered to be high quality even in still-image compression. The number of approximated fragments in the approximated views has often been as high as 95%, which means that only 5% of the fragments execute the full fragment shader program.

It is thus a further advantage that a computer graphics processor and method according to embodiments of the invention may provide 3D images on a display screen with good image quality without the need of excessive use of memory-bandwidth. In terms of implementation, only modest changes to a conventional GPU may be needed. Thus, the additional manufacturing costs of a computer graphics processor enabling good image quality at improved performance is relatively low. Embodiments of the invention may preferably be implemented in devices with limited size, such as mobile telephones, portable computers, etc. Moreover, when implemented in e.g. a mobile telephone or other battery powered device, embodiments of the invention may provide for the avoidance of draining the battery quickly. However, embodiments of the invention are not limited to above-mentioned devices. Other devices where embodiments of the invention may be implemented include e.g. desktop PCs, laptops, game consoles, 3D TVs, glasses with built-in-displays, but is not limited to these applications.

The present invention has been described above with reference to specific embodiments. However, other embodiments than the above described are possible within the scope of the invention. Different method steps than those described above, performing the method by hardware or software or a combination of hardware and software, may be provided within the scope of the invention. The different features and steps of the invention may be combined in other combinations than those described. The scope of the invention is only limited by the appended patent claims.

What is claimed is:

1. A computer graphics processor comprising:
a rasterizer configured to perform pixel traversal for a pair of a first primitive, each pair comprising a group of pixels and one particular view of a plurality of views of a three-dimensional image, and then continue with another pair for the first primitive, and so on, until the first primitive has been fully traversed for each of the plurality of views, prior to performing pixel traversal of the next primitive in the same manner as the first primitive; and
a storage coupled to said rasterizer.

2. The processor of claim 1, said rasterizer to perform pixel traversal of a primitive to perform the pixel traversal of a first primitive for a plurality of views prior to performing pixel traversal of a next primitive for one or more views.

3. The processor of claim 2, wherein the rasterizer to perform the pixel traversal of the first primitive for all views of the plurality of views prior to performing pixel traversal of the next primitive for all views of the plurality of views.

4. The computer graphics processor of claim 3, wherein the rasterizer is operatively connected to a selector adapted to determine an order in which the pairs are to be processed by the rasterizer during the pixel traversal of the primitives.

5. The processor of claim 1, wherein said rasterizer to determine an efficiency measure based on $M_i = f(t_{ui}, t_{vi})$, which can be an arbitrary function of the texture coordinates $(t_{ui}, t_{vi})$.

6. The processor of claim 1, wherein the rasterizer is configured to determine said order based on the efficiency measure for each view of the plurality of views and wherein the rasterizer is configured to determine said efficiency measure based on $$M_i = [du \ dv], \begin{bmatrix} t_{ui} \\ t_{vi} \end{bmatrix}$$

which corresponds to projecting the texture coordinate $(t_{ui}, t_{vi})$ of a representative point of a group of pixels onto the texture traversal direction $(du, dv)$ in texture space, and $M_i$ is the efficiency measure for a view i, and where said group of pixels is next subject to traversal for view i, and the view that is selected for traversal next is the view k, where $M_k$ is the lowest value of all $M_i$.

7. The processor of claim 5, wherein the function f( ) is a space-filling curve.

8. The processor of claim 1, wherein the storage is adapted to temporarily store the generated fragments of the first view in the memory and, for the second view, generate a fragment of the second view by projecting a position of the fragment of the second view into the first view, if fragments of the first view in a neighborhood of the projected position of the fragment of the second view are stored in the memory, generating the fragment of the second view based on said fragments in said neighborhood or, otherwise, generating the fragment of the second view by executing the fragment shader program for the fragment of the second view.

9. The processor of claim 8, wherein a lookup for multiple samples in one view performs only one filtered lookup in another.

10. The processor of claim 8, wherein part of the shading is generated for the first view at one frequency and another part of the shading is further generated at another frequency and so on for more first views and the secondary views perform lookups in all of the first views and combine the shadings into a final shading value.

11. A method of rendering a three-dimensional image on a display, comprising:
performing, on a graphics processor, pixel traversal for a pair of a first primitive, the pair of the primitive;
performing the pixel traversal on the graphics processor of a pair of a first primitive, each pair comprising a group of pixels and one particular view of a plurality of views of a three-dimensional image, and then continuing with another pair for the first primitive, and so on, until the first primitive has been fully traversed for each of the plurality of views, prior to performing pixel traversal of the next primitive in the same manner as the first primitive.

12. The method of claim 11 including performing pixel traversal of a primitive to perform the pixel traversal of a first primitive for a plurality of views prior to performing pixel traversal of a next primitive for one or more views.

13. The method of claim 11 including performing the pixel traversal of the first primitive for all views of the plurality of views prior to performing pixel traversal of the next primitive for all views of the plurality of views.

14. The method of claim 13 including determining an efficiency measure based on Mi=f(tui, tvi), which can be an arbitrary function of the texture coordinates (tui, tvi).

15. The method of claim 14 including determining said order based on the efficiency measure for each view of the plurality of views and wherein the rasterizer is configured to determine said efficiency measure based on $$M_i = [\,du \ \ dv\,], \begin{bmatrix} tui \\ tvi \end{bmatrix}$$

which corresponds to projecting the texture coordinate (tui, tvi) of a representative point of a group of pixels onto the texture traversal direction (du,dv) in texture space, and $M_i$ is the efficiency measure for a view i, and where said group of pixels is next subject to traversal for view i, and the view that is selected for traversal next is the view k, where $M_k$ is the lowest value of all $M_i$.

* * * * *